No. 704,061. Patented July 8, 1902.
M. LOPISICH.
HORSE HOLDING DEVICE.
(Application filed Apr. 21, 1902.)
(No Model.) 2 Sheets—Sheet 1.
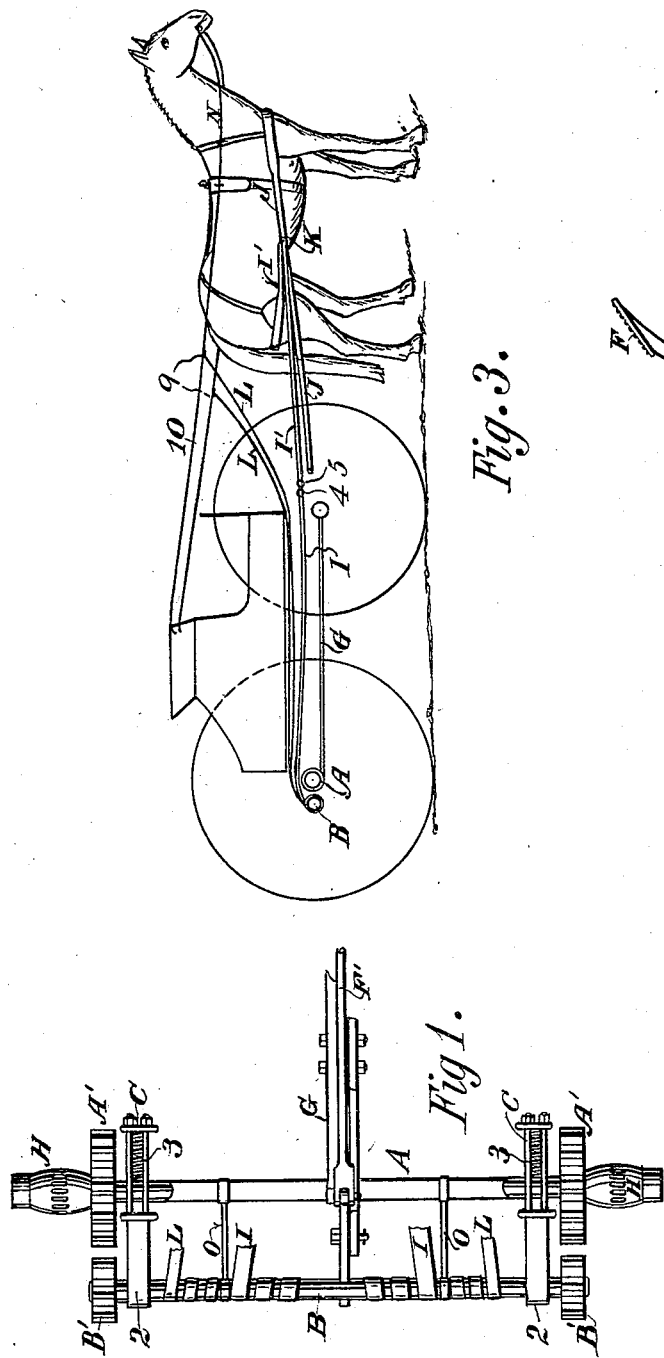
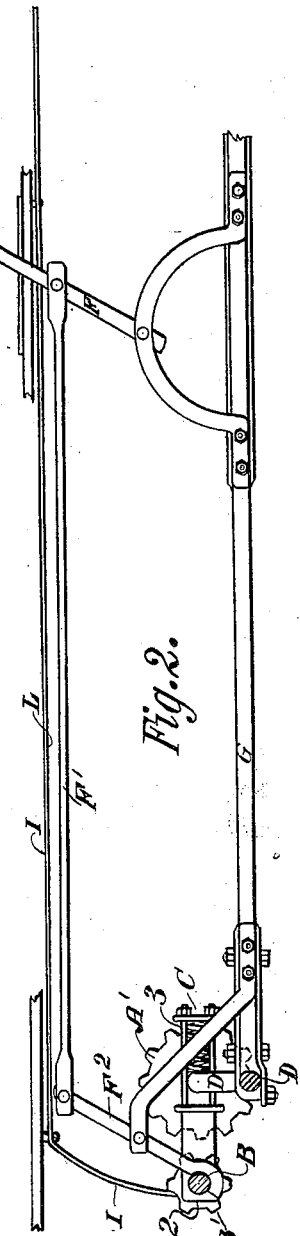
Witnesses,
Chas. E. Townsend
Inventor
Mateo Lopisich
By Dewey Strong & Co.
Atty.

No. 704,061. Patented July 8, 1902.
M. LOPISICH.
HORSE HOLDING DEVICE.
(Application filed Apr. 21, 1902.)
(No Model.) 2 Sheets—Sheet 2.
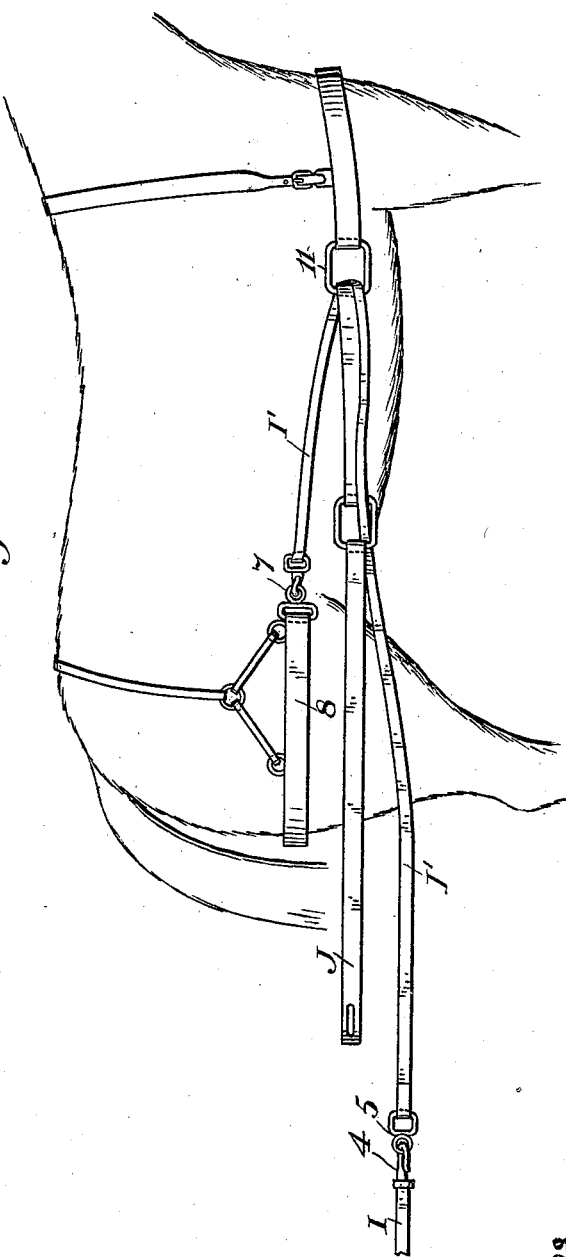

UNITED STATES PATENT OFFICE.

MATEO LOPISICH, OF SACRAMENTO, CALIFORNIA.

HORSE-HOLDING DEVICE.

SPECIFICATION forming part of Letters Patent No. 704,061, dated July 8, 1902.

Application filed April 21, 1902. Serial No. 103,894. (No model.)

*To all whom it may concern:*

Be it known that I, MATEO LOPISICH, a citizen of the United States, residing at Sacramento, county of Sacramento, State of California, have invented an Improvement in Holding Devices for Horses; and I hereby declare the following to be a full, clear, and exact description of the same.

My invention relates to a device which is designed to hold horses and prevent runaways and similar accidents.

It consists of a shaft revolubly and movably supported parallel with the rear axle of a vehicle, having gears adapted to engage with similar gears upon the wheel-hubs, springs by which said gears are normally held in mesh, and a lever mechanism by which the gears may be disengaged to throw the apparatus out of use. Straps or cords are wound upon this shaft extending forward beneath the bottom of the vehicle, and one set of said straps is detachably connected with others which pass through guides upon the tugs or traces and returning thence are connected with the breeching of the harness, while the other set is in like manner detachably connected with the driving-reins.

My invention also comprises details of construction which will be more fully explained by reference to the accompanying drawings, in which—

Figure 1 is a plane of the rear axle of a vehicle, showing application of my invention. Fig. 2 is a side elevation. Fig. 3 is a side elevation of a vehicle, showing my invention. Fig. 4 is a detail view showing the connections of straps I and I' with the breeching.

The device is especially designed to be used where horses are left standing, and it serves to so hamper the horse as to prevent his running away in case he is frightened.

As shown in the drawings, A is the rear axle of any vehicle, and B is the shaft, journaled parallel with and preferably behind the vehicle-axle. The journal-boxes 2, in which the ends of the shaft B turn, are connected with guide-links C, horizontally slidable upon the ends of the axle A, which are usually square, and by means of springs 3, located between the axle and the inner end of the guides, the latter and the shaft are normally drawn forward. Upon each end of the axle are pinions B', and the hubs H of the wheels carry similar intermeshing gears A', so that when the shaft B is drawn forward by the action of the springs 3 these gears will intermesh with those upon the wheels, and the shaft will be rotated whenever the wheels are turning. The shaft B is normally forced backward and the gears B' thrown out of mesh with the gears A' by means of a foot-lever F, suitably located within reach of the driver and connected by a rod F' with a lever F², fulcrumed at some point in the rear of the running-gear, preferably centrally, and connected with the shaft B by a sleeve or socket, through which the shaft is turnable. Straps or cords I are coiled upon the shaft B and extend forward beneath the vehicle and may have snap-hooks or other connections, as at 4, by which they may be united with corresponding rings 5, which are fixed to the rear ends of straps I'.

J represents the tugs or traces by which the vehicle is drawn. The straps I' may lead through any suitable guides upon these traces to a point near the breast-strap or hames, (if the latter be used.) Thence returning they are connected by snap-hooks and rings, as at 7, with the breeching 8. Other cords or straps L are similarly coiled upon the shaft B, extending forward beneath the vehicle, and by means of snap-hooks or other equivalent connections, as at 9, they may be detachably connected with the driving-reins 10.

The operation of the device will then be as follows: The shaft B is normally forced to the rear and its gears B' are held out of engagement with the gears A' of the wheel-hubs, so that no action takes place while the vehicle is being normally driven. When the vehicle is stopped and it is necessary to leave the team or desirable to make it safe, the foot-lever F is disengaged from its holding-rack, and this allows the springs 3 to act and pull the shaft B forward until its gears intermesh with those of the wheel-hubs. The reins 10 may then be connected with the straps or cords L, and the straps I may be connected with the straps I'. If under these conditions the horse should start unexpectedly, the turning of the shaft B will wind up the straps L and I and the straps L will pull upon the bit in proportion as the horse moves forward. At the same time the straps I', by means of their connection with the breeching and returning upon themselves through the guide 11 of the traces, will relieve the traces of the weight of the vehicle and bring the pull upon the straps I', and these returning and being connected with the breeching will pull the latter forward in such a manner as to hamper the hind legs of the horse and prevent him from running.

Either of the devices may be used separately, or they may be used in conjunction with correspondingly greater effect.

In order to steady the shaft B and prevent its springing out of place when in use, I have shown guides O, the inner ends of which are clamped or otherwise secured to the wheel-axle A, and the outer ends have open slots made in them of sufficient diameter to allow the shaft B to slide freely back and forward when operated by the lever F; but these slots or channels form supports which prevent the shaft from springing unduly when the strain is brought upon it.

Having thus described my invention, what I claim, and desire to secure by Letters Patent, is—

1. In a vehicle, a shaft journaled parallel with and behind the rear axle, the guides slidable upon the rear axle, and to which the journal-boxes of the shaft are connected whereby the guides and shaft move in unison, gears fixed to the ends of the shaft, corresponding gears in line therewith carried upon the rear-wheel hubs, springs by which the shaft is normally drawn toward the axle and the gears engaged, and a lever and connections by which the shaft and guides may be moved backward and the gears disengaged.

2. A vehicle having a shaft movably journaled with relation to the rear axle, guides extending from the shaft and slidably mounted upon said axle said shaft and guides movable in unison, gears carried by the shaft in the rear wheels, springs by which the shaft is normally drawn forward and the gears engaged, straps coiled upon the shaft extending forwardly, and means for detachably connecting the straps with the driving-reins and also with the breeching of the harness.

3. A vehicle having a shaft movably journaled with relation to the rear axle, gears carried by the shaft and the rear wheels, springs by which the shaft is normally drawn forward and the gears engaged, straps coiled upon the shaft extending forwardly, other straps detachably connected therewith leading through guides upon the tugs or traces and returned and connected with the breeching of the harness.

4. Means for controlling horses attached to vehicle consisting of a shaft guided and movably mounted with relation to the rear axle of the vehicle, gears carried upon the rear-axle hubs, corresponding gears mounted upon the shaft, springs by which the shaft is normally drawn toward the axle and gears engaged, straps adapted to coil upon the shaft when rotated, connections between said straps and the breeching and driving-reins, and a foot-lever and connections between it and the shaft whereby the latter may be moved and the gears held out of engagement while the vehicle is being driven.

In witness whereof I have hereunto set my hand.

MATEO LOPISICH.

Witnesses:
S. H. NOURSE,
JESSIE C. BRODIE.